United States Patent
Nakagawa

(10) Patent No.: US 9,482,913 B2
(45) Date of Patent: Nov. 1, 2016

(54) ELECTRO-OPTICAL DEVICE AND ELECTRONIC APPARATUS

(75) Inventor: Masashi Nakagawa, Chitose (JP)

(73) Assignee: Seiko Epson Corporation, Tokyo (JP)

( * ) Notice: Subject to any disclaimer, the term of this patent is extended or adjusted under 35 U.S.C. 154(b) by 777 days.

(21) Appl. No.: 13/610,075

(22) Filed: Sep. 11, 2012

(65) Prior Publication Data

US 2013/0082915 A1 Apr. 4, 2013

(30) Foreign Application Priority Data

Oct. 3, 2011 (JP) ................................. 2011-218975

(51) Int. Cl.
*G02F 1/1345* (2006.01)
*G09G 3/36* (2006.01)
*G02F 1/1368* (2006.01)
*G02F 1/1362* (2006.01)

(52) U.S. Cl.
CPC ........... *G02F 1/1345* (2013.01); *G02F 1/1368* (2013.01); *G09G 3/3688* (2013.01); *G02F 1/136286* (2013.01)

(58) Field of Classification Search
CPC combination set(s) only.
See application file for complete search history.

(56) References Cited

U.S. PATENT DOCUMENTS

| | | | |
|---|---|---|---|
| 6,507,375 B1 | 1/2003 | Kawahata | |
| 6,583,471 B1 | 6/2003 | Yamazaki et al. | |
| 2004/0263745 A1* | 12/2004 | Lee et al. | 349/139 |
| 2008/0123008 A1* | 5/2008 | Yoshii | 349/44 |
| 2009/0033819 A1* | 2/2009 | Nakagawa | G02F 1/13454 349/44 |
| 2012/0176561 A1* | 7/2012 | Kim et al. | 349/46 |

FOREIGN PATENT DOCUMENTS

| | | |
|---|---|---|
| JP | 2001-5032 A | 1/2001 |
| JP | 2003-167563 A | 6/2003 |
| JP | 2004-138880 A | 5/2004 |
| JP | 2006-322959 A | 11/2006 |
| JP | 2008-008942 A | 1/2008 |
| JP | 2008-64811 A | 3/2008 |
| JP | 2011-66432 A | 3/2011 |
| JP | 2011-186362 A | 9/2011 |

* cited by examiner

*Primary Examiner* — Amr Awad
*Assistant Examiner* — Andre Matthews
(74) *Attorney, Agent, or Firm* — ALG Intellectual Property, LLC

(57) ABSTRACT

A liquid crystal device as an electro-optical device includes an image signal line which is supplied with an image signal, a data line, and sampling transistors (S-TFT) as first and second transistors which are electrically connected between the data line and the image signal line and supply the image signal to the data line, where at least two types of S-TFTs are provided so that the overlapping amounts where gate electrodes of the S-TFTs and first data line overlap are different. Due to this, parasitic capacitance occurs between the gate electrode and the data line, it is possible to adjust the structural parasitic capacitance of each data line by the overlapping amounts being different, and it is possible to improve the display irregularities in series as streaks.

12 Claims, 7 Drawing Sheets

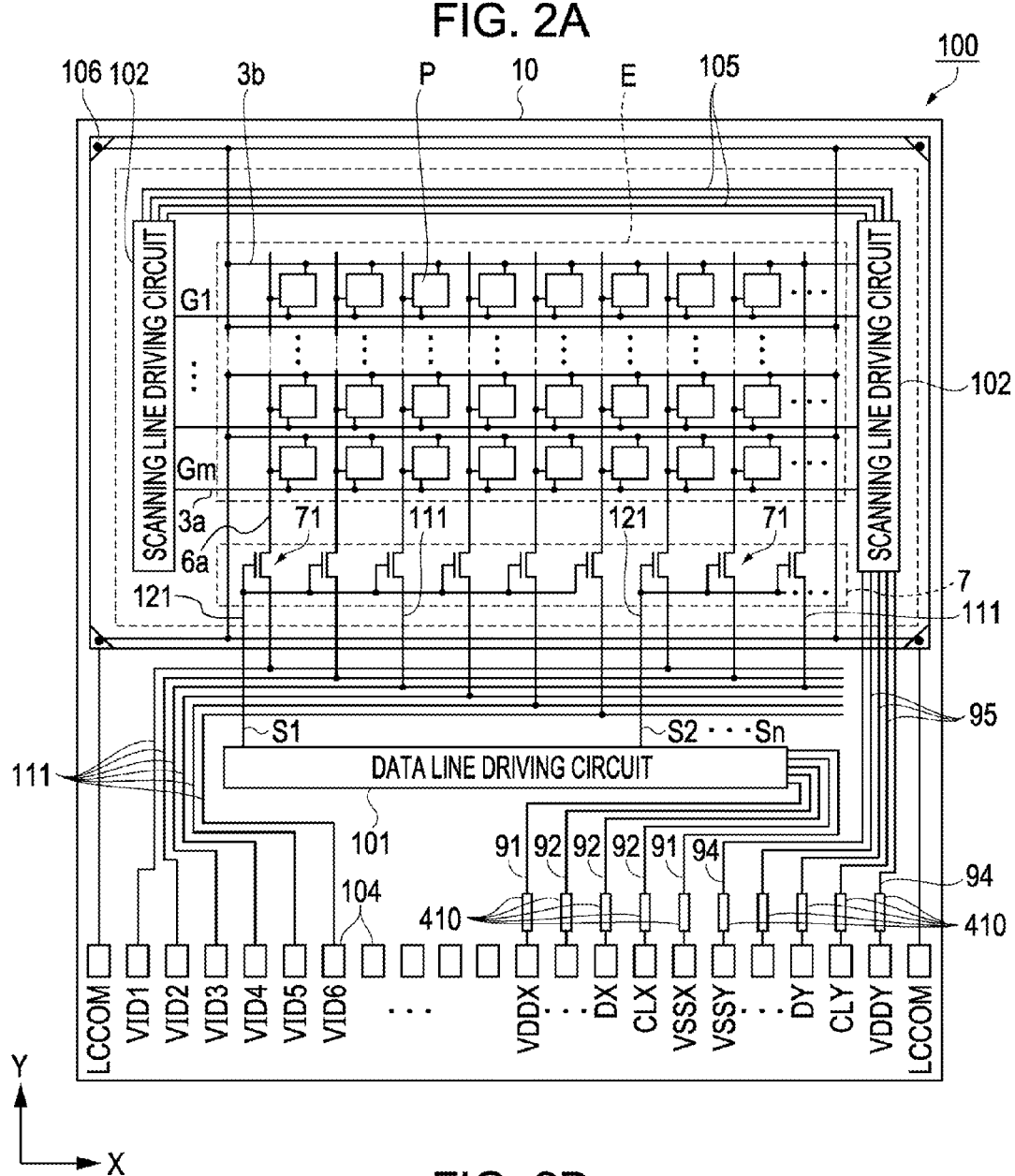
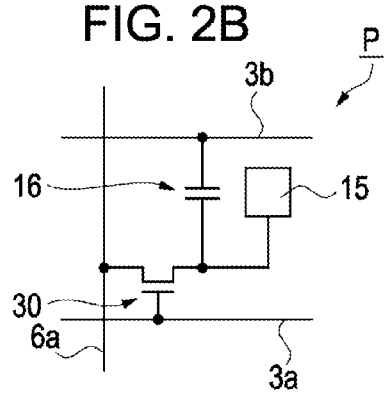

ELECTRO-OPTICAL DEVICE AND ELECTRONIC APPARATUS

BACKGROUND

1. Technical Field

The present invention relates to an electro-optical device and an electronic apparatus which is provided with the electro-optical device.

2. Related Art

As the electro-optical device, a display device is known (JP-A-2006-322959) where, when the number of signal lines which are arranged for each pixel arranged in a matrix formation on a substrate is set as n and N lines (where N is an integer of two or more) is set as a unit with regard to each of the n signal lines, n/N video lines which are arranged so that an output terminal is positioned between every two adjacent signal lines, switching means for connecting between the output terminal of the video line and every two signal lines, and a plurality of switching control lines for switching the switching means on and off is provided.

In the display device in JP-A-2006-322959, each of the switching control lines are respectively connected to the switching means which corresponds thereto via a connection wiring and the connection wiring is formed in a state of overlapping or not overlapping with the video lines. Due to this, in a case where there is an attempt to secure symmetry of the layout of the wiring, since the coupling capacitance of the connection wiring and the video lines which are linked to the switching control lines have been made to be uniform, it is possible to prevent noise in vertical streaks which occurs on a screen due to a difference in the coupling capacitance.

However, in the display device in JP-A-2006-322959, it is possible to make uniform the rising timing of the video signal and the gate signal of the transistor as the switching means when seen from the signal line side, but there is a problem in that it is not possible to resolve display irregularities in series as streaks caused by the parasitic capacitance of the signal line.

SUMMARY

The invention can be realized in the following forms or application examples.

APPLICATION EXAMPLE 1

According to Application Example 1, there is provided an electro-optical device including an image signal line which is supplied with an image signal, a first data line, a second data line, a first transistor which is electrically connected between the first data line and the image signal line and supplies the image signal to the first data line, and a second transistor which is electrically connected between the second data line and the image signal line and supplies the image signal to the second data line, where the overlapping amount where a gate electrode of the first transistor and the first data line overlap via an insulation film and the overlapping amount where a gate electrode of the second transistor and the second data line overlap via an insulation film are different.

Due to the layout (lining up) of the plurality of data lines as wiring, the parasite capacitance which occurs in each of the data lines is not necessarily constant. When the potential of the image signal which is supplied to each of the data line changes due to the parasitic capacitance which occurs in each of the data lines, display irregularities in series as streaks occur across a plurality of pixel electrodes which are lined up along the data lines.

According to this configuration, due to the parasite capacitance which additively occurs due to the gate electrode overlapping with the data lines which correspond to each of the transistors on a semiconductor layer of the first and the second transistors, a feed through phenomenon which makes the movement of charge between the gate electrode and the data lines via the semiconductor layer during the ON-OFF of the first and second transistors. Due to this, the potential, according to the image signal which is written to the pixel electrode via the data lines, is reduced. Accordingly, for example, by the overlapping amounts of the gate electrodes of the first and the second transistors, which respectively correspond to the first data line where the display irregularities in series as streaks occur and the second data line which is adjacent to the first data line, and the corresponding data lines being made to differ, it is possible for the display irregularities as streaks to be difficult to stand out by alleviating the difference in the potentials according to the image signals which is supplied to the pixel electrode from both of the data lines. That is, by having at least the first and second transistors where the overlapping amounts are different, it is possible to improve the display irregularities in series as streaks. In addition, since it is possible to alleviate the difference in parasitic capacitance which each data line structurally has if the overlapping amounts of the gate electrode and the data line in each of the transistors are set to correspond to each of the data lines, it is possible to provide an electro-optical device with uniform display quality by reducing the display irregularities in series as streaks.

APPLICATION EXAMPLE 2

In the electro-optical device according to Application Example 1 described above, the image signal line has a first image signal line which is electrically connected to the first transistor and a second image signal line which is electrically connected to the second transistor, and selection signal supply means is provided which supplies selection signals with the same phase to the gate electrode of the first transistor and the gate electrode of the second transistor.

According to this configuration, in an electro-optical device where phase expansion driving is applied so that the first and second transistors are switching controlled using the selection signals with the same phase and the image signals are supplied at substantially the same time to the first data line and the second data line, it is possible to reduce the display irregularities which are within series, between series, or in series with regard to the image signals.

APPLICATION EXAMPLE 3

In the electro-optical device according to Application Example 1 described above, a first selection signal supply line which is electrically connected to the gate electrode of the first transistor and is supplied with a first selection signal, and a second selection signal supply line which is electrically connected to the gate electrode of the second transistor and is supplied with a second selection signal at a timing which is different to the first selection signal, and selection signal supply means which supplies the first selection signal and the second selection signal.

According to this configuration, for example, in an electro-optical device which is provided with a plurality of pixels such as in Hi-Vision, it is possible to reduce the display irregularities in series caused by structural parasitic capacitance within a series of the data line where selection signals are supplied at the same timing or in different series where the first selection signal and the second selection signal are supplied at different timings.

APPLICATION EXAMPLE 4

In the electro-optical device according to Application Example 1 described above, a scanning line, a first pixel which is provided according to the intersection of the scanning line and the first data line, and a second pixel which is provided according to the intersection of the scanning line and the second data line are provided and the first pixel is positioned in odd rows and the second pixel is positioned in even rows.

According to this configuration, by adjusting the parasitic capacitance caused by the wiring structure in each of the first data line which corresponds to the first pixel in odd rows and the second data line which corresponds to the second pixel in even rows, it is possible to reduce the display irregularities in series in the odd rows and even rows.

APPLICATION EXAMPLE 5

In the electro-optical device according to Application Example 1 described above, the first data line is positioned at a lower layer of the second data line and the overlapping amount where the gate electrode of the first transistor and the first data line overlap via an insulation film is larger than the overlapping amount where the gate electrode of the second transistor and the second data line overlap via an insulation film.

According to this configuration, for example, in the first data line and the second data line which are layered in a lower layer and an upper layer on the substrate, the structural parasitic capacitance of the first data line which is closer to the substrate is smaller compared to the structural parasitic capacitance of the second data line which is farther from the substrate. Due to this, by the overlapping amount where the gate electrode in the first transistor, which is electrically connected to the first data line which is closer to the substrate, and the first data line overlap via an insulation film being larger than the overlapping amount of the second transistor, it is possible to correct the structural parasitic capacitance of the first data line compared to the second data line which is farther from the substrate. That is, the first data line side is optimized with a potential, which is based on the image signal which is supplied to each of the first data line and the second data line, as a reference for the second data line.

APPLICATION EXAMPLE 6

In the electro-optical device according to Application Example 1 described above, the gate electrode of the second transistor is formed so as not to overlap with the second data line via an insulation film.

According to this configuration, since the overlapping amount of the gate electrode in the second transistor and the second data line is zero, it is possible to reduce the difference in structural parasitic capacitance in the first data line and the second data line using a simple configuration.

APPLICATION EXAMPLE 7

According to Application Example 7, there is provided an electronic apparatus including the electro-optical device described above.

According to this configuration, it is possible to provide an electronic apparatus where display irregularities in series as streaks are reduced and a display with excellent appearance is possible.

BRIEF DESCRIPTION OF THE DRAWINGS

The invention will be described with reference to the accompanying drawings, wherein like numbers reference like elements.

FIG. 2A is a circuit diagram illustrating a main circuit configuration of the liquid crystal device and FIG. 2B is an equivalent circuit diagram illustrating a pixel circuit.

DESCRIPTION OF EXEMPLARY EMBODIMENTS

Below, specific embodiments of the invention will be described according to the attached diagrams. Further, the diagrams which are used to display an appropriate magnification or reduction so as to be in a state where a portion which is being described is recognizable.

Here, in the following embodiment, for example, in a case where "on a substrate" is described, a case of being arranged so as to be in contact with the top of a substrate, a case of being arranged on a substrate with other constituent elements therebetween, or a case of a portion thereof being arranged to be in contact with the top of a substrate and another portion being arranged with other constituent elements therebetween are included.

First Embodiment

The present embodiment is described with an active matrix type liquid crystal device which is provided with a thin film transistor (TFT) as a pixel switching element as an example of an electro-optical device. It is possible for this liquid crystal device to be appropriately used as, for example, an optical modulation element (liquid crystal light valve) of a projector type display device (liquid crystal projector) which will be described later.

Liquid Crystal Device

Figure 1A:
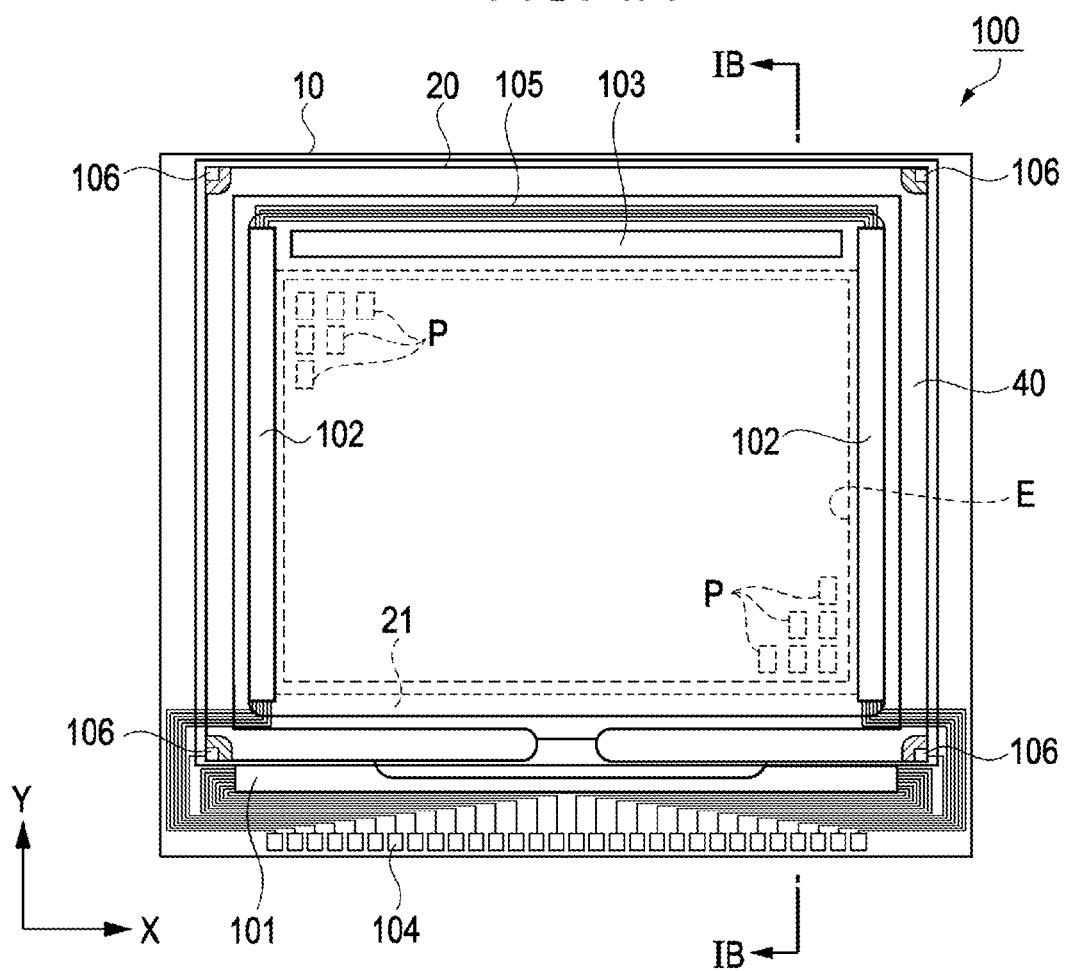
FIG. 1A is a schematic planar view illustrating a configuration of a liquid crystal device and FIG. 1B is a schematic cross-sectional view along a line IB-IB of the liquid crystal device illustrated in FIG. 1A.

First, a schematic structure of a liquid crystal device as the electro-optical device of the present embodiment will be described with reference to FIGS. 1A and 1B. FIG. 1A is a schematic planar view illustrating a configuration of a liquid crystal device and FIG. 1B is a schematic cross-sectional view along a line IB-IB of the liquid crystal device illustrated in FIG. 1A.

Figure 1B:
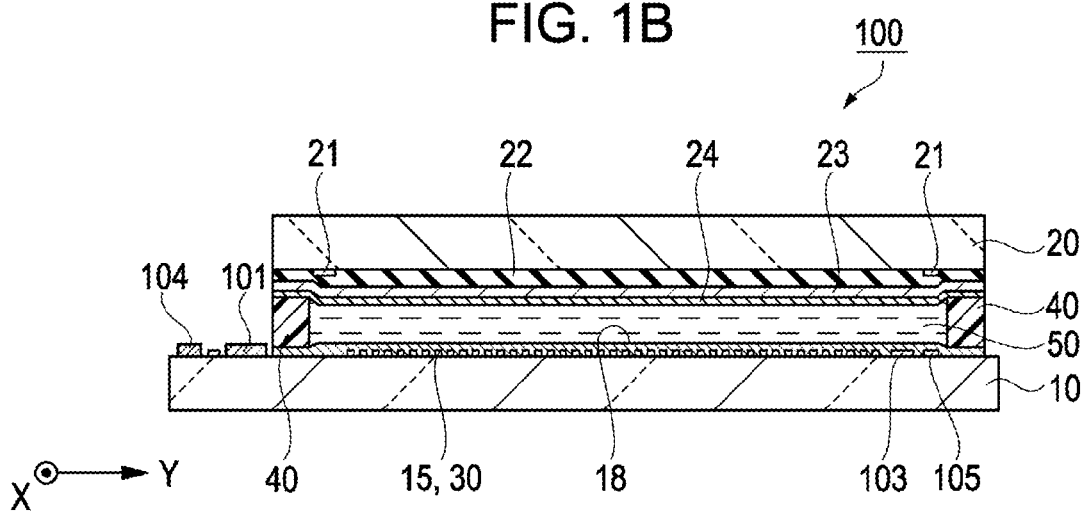

As illustrated in FIGS. 1A and 1B, a liquid crystal device 100 as the electro-optical device of the present embodiment has an element substrate 10 and an opposing substrate 20 which are arranged to oppose, and a liquid crystal layer 50 which is interposed by the pair of substrates. The element substrate 10 and the opposing substrate 20 use, for example, a transparent quartz substrate or glass substrate.

The element substrate 10 is slightly larger than the opposing substrate 20, both substrates are connected by a sealing material 40 which is arranged in a frame shape, and the liquid crystal layer 50 is configured by enclosing liquid crystals which have positive or negative dielectric anisotropy in this gap. As the sealing material 40, for example, an adhesive such as thermosetting or sclerotic epoxy resin is adopted. In the sealing material 40, spacers (not shown) are mixed in so that a space is constantly maintained between the pair of substrates.

In the inner side of the sealing material 40 which is arranged in a frame shape, a cut-out section 21 which has the same frame shape is provided. The cut-out section 21 consists of, for example, a light blocking metal or metallic oxide, and becomes a pixel region E where the inner side of the cut-out section 21 has a plurality of pixels P. Here, the pixel region E may include a dummy pixel which is arranged so as to encompass a plurality of the pixels P in addition to the plurality of pixels which contribute to the display. In addition, although omitted in FIGS. 1A and 1B, a light blocking portion is provided so that the plurality of pixels P are partitioned in a planar manner in the pixel region E.

A data line driving circuit 101 is provided between the sealing member 40 which is along one side portion of the element substrate 10 and the one side portion. In addition, a checking circuit 103 is provided at the inner side of the sealing material 40 along the one other side portion which opposes the one side portion. Furthermore, scanning line driving circuits 102 are provided at the inner sides of the sealing material 40 along two other side portions which are orthogonal to the one side portion and oppose each other. At an inner side of the sealing material 40 at the one other side portion which opposes the one side portion, a plurality of wirings 105 are provided which link the two scanning line driving circuits 102.

The wirings which link the data line driving circuit 101 and the scanning line driving circuits 102 are connected to a plurality of external connection terminals 104 which are lined up along the one side portion. Hereinafter, there is description where the direction along the one side portion is set as the X direction and the direction along the two other side portions which are orthogonal to the one side portion and oppose each other are set as the Y direction. Here, the arrangement of the checking circuit 103 is not limited thereto and may be provided at a position along the inner side of the sealing material 40 between the data line driving circuit 101 and the pixel region E.

As shown in FIG. 1B, on the surface on the liquid crystal layer 50 side of the element substrate 10, a pixel electrode 15 with optical transparency and a thin film transistor 30 (abbreviated below to TFT) as a switching element which are provided for each pixel P, a signal line, and an orientation film 18, which covers these, are formed. In addition, a light blocking structure is adopted where the switching action becomes unstable due to light being irradiated onto a semiconductor layer in the TFT 30.

On the surface on the liquid crystal layer 50 side of the second substrate 20, the cut-out section 21, an interlayer film layer 22 which is deposited to cover this, a common electrode 23 which is provided so as to cover the interlayer film layer 22, and an orientation film 24 which covers the common electrode 23 are provided.

The cut-out section 21 is provided in a frame shape in a position which overlaps with the scanning line driving circuits 102 and the checking circuit 103 in a planar view as shown in FIG. 1A. Due to this, a function is accomplished in which erroneous actions, which are due to light from a peripheral circuit which includes these driving circuits by the light which is incident from the opposing substrate 20 side being blocked, are prevented. In addition, high contrast in the display in the pixel region E is secured by unnecessary stray light being blocked so as to not be irradiated onto the pixel region E.

The interlayer film layer 22 is formed from, for example, an inorganic material such as silicon oxide and is provided so as to have optical transparency and cover the cut-out section 21. As a method for forming the interlayer film layer 22, for example, there are the examples of a method of depositing using a plasma CVD method or the like.

The common electrode 23 is formed from, for example, a transparent conductive film such as ITO (Indium Tin Oxide), covers the interlayer insulation film 22, and is electrically connected to the wiring on the element substrate 10 side using a vertical connection portion 106 which is provided in the four corners of the opposing substrate 20 as shown in FIG. 1A.

The orientation film 18 which covers the pixel electrode 15 and the orientation film 24 which covers the common electrode 23 are selected based on the optical design of the liquid crystal device 100. For example, there are the examples of an orientation film where substantially horizontal orientation processing is carried out with regard to the liquid crystal molecules due to an organic material such as polyimide being deposited and the surface thereof being wrapped and an orientation film which is substantially vertically oriented with regard to the liquid crystal molecules by an inorganic material such as SiOx (silicon oxide) being deposited using a gas phase growth method.

In this manner, the liquid crystal device 100 adopts an optical design of a normally white mode which is transparent and is a bright display when the pixel P is not driven and a normally black mode which is a dark display when not driven. Polarizing elements are used in each of the incident side and the emission side of the light by being arranged according to the optical design.

Figure 3A:
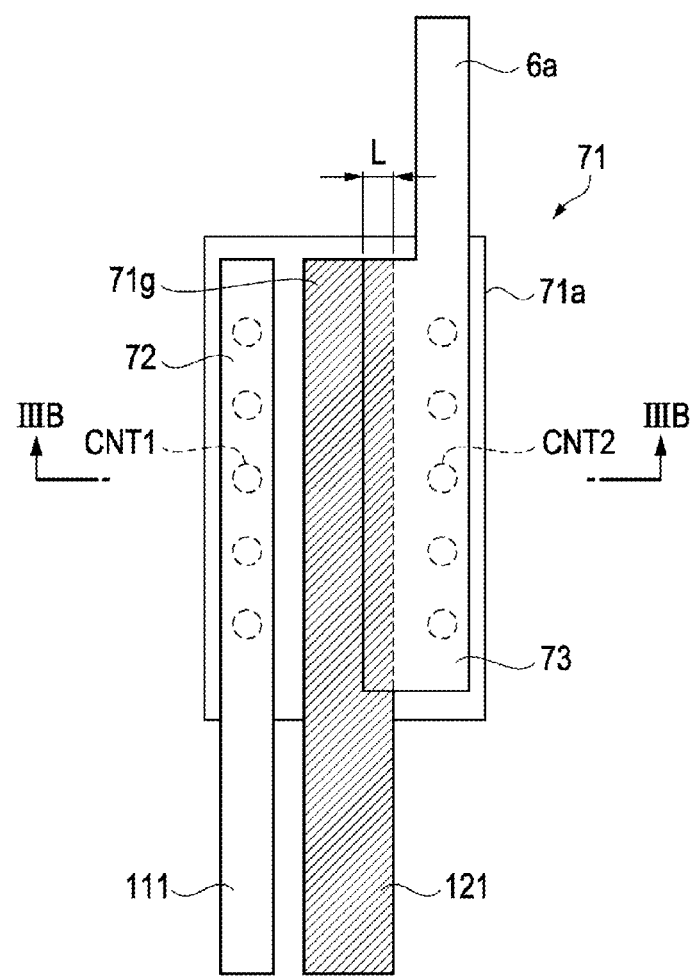
FIG. 3A is a schematic planar view illustrating a configuration of a transistor in a sampling circuit and FIG. 3B is a schematic cross-sectional view along a line IIIB-IIIB in FIG. 3A.
Figure 3B:
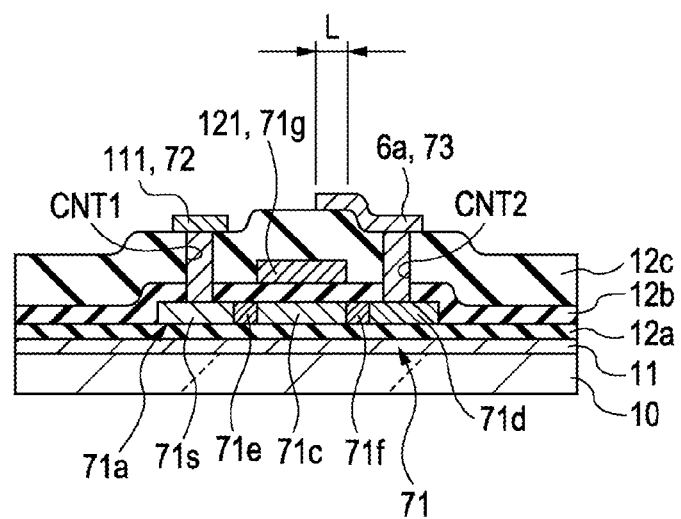
Figure 4:
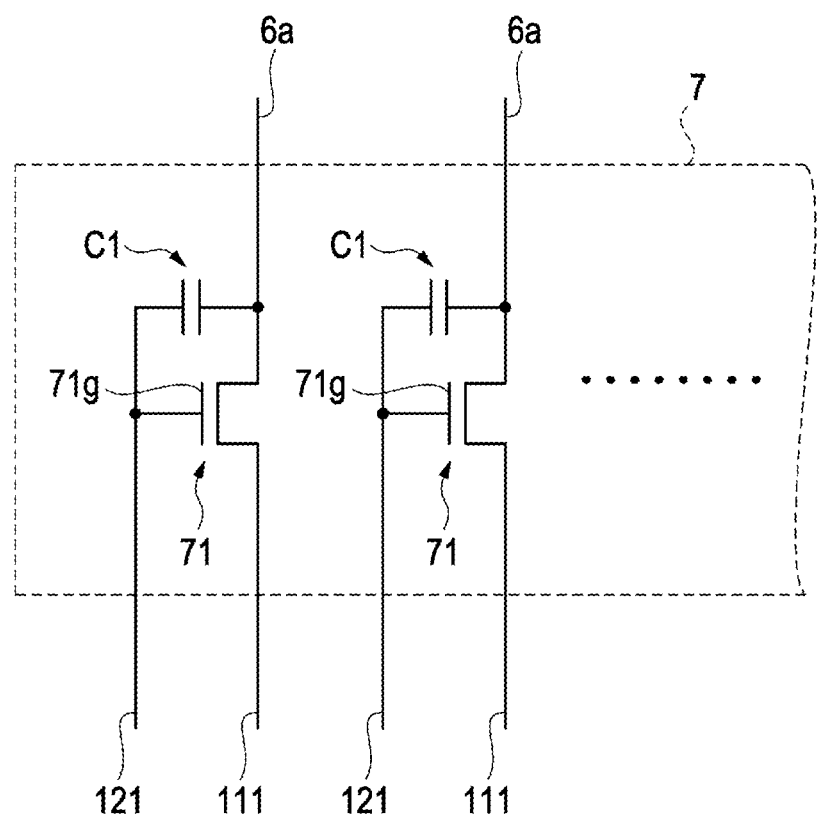
FIG. 4 is an equivalent circuit diagram of a sampling circuit.

Next, an electrical configuration of the liquid crystal device 100 will be described with reference to FIGS. 2A to 4. FIG. 2A is a circuit diagram illustrating a main circuit configuration of the liquid crystal device, FIG. 2B is an equivalent circuit diagram illustrating a pixel circuit, FIG. 3A is a schematic planar view illustrating a configuration of a transistor in a sampling circuit, FIG. 3B is a schematic cross-sectional view along a line IIIB-IIIB in FIG. 3A, and FIG. 4 is an equivalent circuit diagram of a sampling circuit.

As shown in FIG. 2A, the liquid crystal device 100 has driving circuits such as the data line driving circuit 101, the scanning line driving circuit 102, and a sampling circuit 7, which are formed on a peripheral region which is positioned in the periphery of the pixel region E on the element substrate 10, the external connection terminals 104, and a static electricity protection circuit 410. Furthermore, there are a plurality of drawn-out wires which are connected to the external connection terminal 104 and which include a data line driving circuit power source wire 91 for supplying a power source (VDDR, VSSX) to the data line driving circuit 101, a data line driving circuit signal wire 92 for supplying a signal for driving to the data line driving circuit 101, a scanning line driving circuit power source wire 94 for supplying a power source (VDDY, VSSY) to the scanning line driving circuit 102, a scanning line driving circuit signal wire 95 for supplying a signal for driving to the scanning line driving circuit 102, a plurality of image signal wires 111 for supplying image signals (VID1 to VID6), and the like.

In the data line driving circuit 101, an X clock signal CLX (and an inverse X clock signal CLXB) and an X start pulse DX are supplied from an external circuit via the external connection terminals 104 and the data line driving circuit signal wire 92. When the X start pulse DX is input into the data line driving circuit 101, selection signals S1, S2, . . . , Sn are sequentially generated at a timing based on the X clock signal CLX (and the inverse X clock signal XCLXB) and respectively output to a plurality of selection signal supply lines 121.

In the scanning line driving circuit 102, a Y clock signal CLY (and an inverse Y clock signal CLYB) and an Y start pulse DY are supplied from an external circuit via the external connection terminals 104 and the scanning line driving circuit signal wire 95. The scanning line driving circuit 102 sequentially generates scanning signals G1, G2, . . . , Gm based on these signals and respectively outputs to a plurality of scanning lines 3a.

The sampling circuit 7 is provided with a plurality of sampling transistors (abbreviated below to S-TFT) as the first transistor and the second transistor of the invention which are configured from a N channel type of single channel type TFT or a complementary type TFT. The gates of six of the S-TFTs 71, which are respectively connected to six of the data lines 6a which are adjacent to each other, are grouped as one and are connected to one selection signal supply line 121. That is, each of the selection signals S1, S2, . . . , Sn from the data line driving circuit 101 is supplied to the six S-TFTs 71 as one unit (series). In the source of the six S-TFTs 71 which configure one unit (series), any out of six of the image signal lines 111 are connected. In the drain of the S-TFTs 71, the data line 6a is connected. When the selection signals S1, S2, . . . , Sn are input, the sampling circuit 7 supplies the image signals (VID1 to VID6) sequentially according to the selection signals S1, S2, . . . , Sn to the data lines 6a which corresponds to the six S-TFTs 71 which configure one unit (series).

The static electricity protection circuit 410 is formed in the middle of each of the data line driving circuit power source wire 91, the data line driving circuit signal wire 92, the scanning line driving circuit power source wire 94, and the scanning line driving circuit signal wire 95. As a specific configuration of the static electricity protection circuit 410, for example, it is possible to adopt the static electricity protection circuit which various types of known formats such as a format where each of the data line driving circuit power source wire 91, the data line driving circuit signal wire 92, the scanning line driving circuit power source wire 94, and the scanning line driving circuit signal wire 95 are connected to a wiring with a constant potential via a TFT which is connected to a diode or via a diode.

As shown in FIGS. 2A and 2B, as described above, the liquid crystal device 100 has the plurality of pixels P which are lined up in a matrix formation in the pixel region E which occupies a central portion of the element substrate 10.

In the plurality of pixels P, the pixel electrode 15, the TFT 30 for switch controlling the pixel electrode 15, and the holding capacitance 16 are each formed. The data line 6a which is supplied with the image signals (VID1 to VID6) is electrically connected to the source of the TFT 30. The scanning line 3a which is supplied with the scanning signals G1, G2, . . . , Gm is connected to the gate of the TFT 30. One of the electrodes out of the pixel electrode 15 and the holding capacitance 16 is connected to the drain of the TFT 30. The other electrode of the holding capacitance 16 is connected to the capacitance line 3b which is arranged in series with the scanning line 3a. The capacitance line 3b may be arranged in series with the data line 6a or arranged in a matrix formation, and is connected to a fixed potential (for example, LCCOM).

The selection signals S1, S2, . . . , Sn which are supplied to the six S-TFTs 71 with the six sampling circuits 7 as one unit (series) may be supplied sequentially in order or may be supplied for each series with regard to the S-TFTs 71 which correspond to the six adjacent data lines 6a. Here, as shown in FIG. 2A, in the embodiment, the selection signals S1, S2, . . . , Sn are configured so as to be supplied for each group (series) with regard to a group of six data lines 6a which correspond to each of the image signals (VID1 to VID6) which are developed in serial-parallel in six phases. The phase development function of the image signals (VID1 to VID6) (that is, the number of the series of the image signal which are developed in serial-parallel) is not limited to six phases, and for example, the image signals which are developed in a plurality of phases such as 9 phases, 12 phases, or 24 phases may be configured to be supplied with regard to a group of the data lines 6a where the number corresponding to the development number is one group.

The scanning signals G1, G2, . . . , Gm are configured to be applied sequentially in order in pulses at a predetermined timing from the scanning line driving circuit 102 into the scanning line 3a. As described above, the pixel electrode 15 is electrically connected to the drain of the TFT 30, the TFT 30 is in an ON state for only a certain period of time using the scanning signals G1, G2, . . . , Gm, and the image signals (VID1 to VID6) which are supplied from the data line 6a are written to the pixel electrode 15 at a predetermined timing.

Furthermore, in order to prevent the image signal (VID1 to VID6) which is held at each of the pixels P from leaking, a liquid crystal capacitance which is formed between the pixel electrode 15 and the common electrode 23 is applied in series with the holding capacitance 16.

The image signals (VID1 to VID6) with a predetermined level which is written to the liquid crystal layer 50 (refer to FIG. 1B) via the pixel electrode 15 are held for a certain period of time between the common electrode 23 which is formed in the opposing substrate 20. Due to the orientation and the ordering of the liquid crystal molecules from the applied voltage level, the liquid crystal layer 50 modulates the light which passes through the liquid crystal layer 50 and gradation display is possible. If a normally white mode, the tranmissivity with regard to incident light according to the voltage which is applied to the units of each pixel P is reduced and there is a dark display, and if a normally black mode, the tranmissivity with regard to incident light according to the voltage which is applied to the units of each pixel P is increased and there is a bright display, display light which has contrast according to the image signals (VID1 to VID6) is emitted from the entire liquid crystal device 100 and displaying is performed. Here, the image signals (VID1 to VID6) is configured by a potential pulse which has a positive polarity and a potential pulse which has a negative polarity with regard to a reference potential for alternately driving the liquid crystal layer 50 are combined.

The method for driving the liquid crystal device 100 as described above is referred to as a phase development driving method. A plurality of data lines 6a, which are arranged so that a plurality of the scanning lines 3a and a plurality of the capacitance lines 3b intersect in the pixel region E, are not limited to necessarily having a constant structural parasitic capacitance due to the relative arrangement relationship of these scanning lines 3a and capacitance lines 3b. In addition, there is a concern of variations in the parasitic capacitance according to the respective layouts when the plurality of data lines 6a are formed. In the phase development driving method, in particular, as in FIG. 15 of Japanese Patent No. 4044961, the sampling circuits, the wiring which supplies the selection signal S1, S2, . . . , Sn, and the image signal lines are laid out into wiring and circuits according to the groups of data lines 6a where the number corresponding to the development number is set as one group and the group is driven as a unit. Accordingly, there are concerns of there being variations in the parasitic capacitance in the group. For example, when the structural parasitic capacitance in a specific data line 6a is electrically large or small compared to the adjacent data line 6a, a difference occurs in the potential which is supplied according to the image signal between the adjacent data lines 6a and display irregularities in series as streaks occur since the potential which is written across the row of a plurality of pixel electrodes 15, which are lined up along the specific data line 6a changes as a result of this. The inventors discovered that it is possible to improve the display irregularities in series as streaks using the design of the configuration of the S-TFT 71 in the sampling circuit 7.

Hereinafter, the configuration of the sampling transistor (S-TFT) 71 of the sampling circuit 7 will be described with reference to FIG. 3A to 4.

As shown in FIG. 3A, the S-TFT 71 has a semiconductor layer 71a with substantially a rectangular shape in a planar view. The selection signal supply line 121 is arranged to overlap via a second insulation film 12b (gate insulation film) on the upper surface of the semiconductor layer 71a and a portion where the semiconductor layer 71a and the selection signal supply line 121 overlap functions as a gate electrode 71g of the S-TFT 71. The data line 6a and the image signal line 111 overlap with the semiconductor layer 71a along the channel width direction of the S-TFT 71 and are arranged in series so as to interpose the gate electrode 71g in the channel length direction of the S-TFT 71. In the data line 6a, the line width in a portion which overlaps with the semiconductor layer 71a is extended compared to the line and this portion overlaps with the gate electrode 71g. The dimension L shown in FIGS. 3A and 3B shows the overlapping amount of the gate electrode 71g and the extension section of the data line 6a.

The image signal line 111 is connected to a first source and drain region of the semiconductor layer 71a via a plurality of contact holes CNT1 which are arranged along the channel width direction of the S-TFT 71 of the semiconductor layer 71a and the portion which overlaps with the semiconductor layer 71a functions as a source electrode 72.

The data line 6a is connected to a second source and drain region of the semiconductor layer 71a via a plurality of contact holes CNT2 which are arranged along the channel width direction of the S-TFT 71 of the semiconductor layer 71a in the same manner and the portion which overlaps with the semiconductor layer 71a functions as a drain electrode 73.

As shown in FIG. 3B, the semiconductor layer 71a of the S-TFT 71 is formed on a first insulation film 12a which covers a light blocking section 11 on the element substrate 10. The light blocking section 11 is able to adopt a single high-melting-point metal such as Ti, Cr, W, Ta, Mo, and Pd, an alloy which is selected from these high-melting-point metals, a metal silicide, a poly silicide, a laminate of these, or the like. The first insulation film 12a is an inorganic insulation film formed from silicon oxide which is formed using, for example, a CVD method.

The semiconductor layer 71a is, for example, formed from polysilicon and is able to adopt an LDD (Lightly Doped Drain) structure which is formed by selectively inserting impurity ions. Specifically, there is a channel region 71c, a first source and drain region 71s and a second source and drain region 71d which interpose the channel region 71c, a connection region 71e which is formed between the first source and drain region 71s and the channel region 71c, and a connection region 71f which is formed between the second source and drain region 71d and the channel region 71c.

The second insulation layer 12b (gate insulation film) formed from, for example, silicon oxide or the like is formed to cover the semiconductor layer 71a. The selection signal supply line 121 is formed so as to overlap with the channel region 71c of the second insulation film 12b and functions as the gate electrode 71g. The selection signal supply line 121 is able to adopt a low-melting-point metal such as polysilicon, Al, Ag, Au, and Cu, a single high-melting-point metal such as W and Ti, an alloy which is selected from these high-melting-point metals, a metal silicide, a poly silicide, a laminate of these, or the like. A third insulation film 12c formed from, for example, silicon oxide is formed as an insulation film in the invention to cover the gate electrode 71g.

The contact hole CNT1 is formed in a portion where the second insulation film 12b and the third insulation film 12c overlap with the first source and drain region 71s and the contact hole CNT2 is formed in a portion of overlapping with the second source and drain region 71d in the same manner. The image signal line 111 which is electrically connected to the first source and drain region 71s via the contact hole CNT1 is formed by depositing, for example, a low-resistance conductive film such as Al so as to fill in the contact holes CNT1 and CNT2 and by patterning the film. In the same manner, the data line 6a which is electrically connected to the second source and drain region 71d via the contact hole CNT2 is formed. At this time, the data line 6a is formed by patterning so as to overlap with an overlapping amount L with regard to the gate electrode 71g.

As described above, by the data line 6a and the gate electrode 71g overlapping with an overlapping amount L via the third insulation film 12c, it is possible to generate a parasitic capacitance C1 between the data line 6a (drain electrode 73) and the gate electrode 71g in the S-TFT 71 of the sampling circuit 7 as shown in FIG. 4. Due to the parasitic capacitance C1, there is a feed through phenomenon which generates the movement of charge between the gate electrode 71g and the data line 6a via the semiconductor layer 71a during the ON-OFF of the S-TFT 71. Due to this, there is a reduction in the potential according to the image signals (VID1 to VID6) which is written to the pixel electrode 15 via the TFT 30 which is the switching element of the data lines 6a in the pixel P.

Accordingly, for example, by the overlapping amounts L of the gate electrodes 71g of the two S-TFTs 71, which correspond to each of the data line 6a (first data line) which generates display irregularities in series as streaks and the data line 6a (second data line) which is adjacent to the data line 6a and the data line 6a, being different, it is possible for it to be difficult for the display irregularities in series as streaks to stand out by alleviating the difference in the potential according to the image signals (VID1 to VID6)

which are supplied to the pixel electrode 15 from both of the data lines 6a. In addition, since it is possible to correct and alleviate differences in the structural parasitic capacitance of each of the data lines 6a if the overlapping amount L of the gate electrode 71g in the S-TFT 71 and the data line 6a, that is, the electrical capacitance of the parasitic capacitance C1, is set to correspond to each of the data lines 6a, it is possible to reduce the display irregularities in series as streaks and to realize a uniform display quality.

For example, when the line width of the selection signal supply line 121 which functions as the gate electrode 71g is set as 5 μm, the parasitic capacitance C1 is configured via the third insulation film 12c by setting the overlapping amount L to dimensions which are 0.5 μm or more and 5.0 μm or less. The value of the parasitic capacitance C1 which is configured depends on the dielectric constant and the film thickness of the third insulation film 12c and the area of the overlapping and the third insulation film 12c is a silicon oxide film which is formed using, for example, a thermal CVD or plasma CVD and the film thickness thereof is 200 nm to 1 μm. In the configuration as described above, by setting the overlapping amount L, it is possible to increase the parasitic capacitance C1 between the gate electrode 71g and the data line 6a compared to a case without overlapping and it is possible to correct and alleviate differences in the structural parasitic capacitance of each data line 6a. That is, by setting the desired overlapping amount L in the drain electrode 73 which is connected to the data line 6a where the parasitic capacitance between the wiring other than the gate electrode 71g, that is, the capacitance line 3b is smaller than other data lines 6a, the feed through phenomenon is promoted and it is possible to match up the potentials after having been written to be the same as the other data lines 6a. In addition, for example, by setting the desired overlapping amount L in the drain electrode 73 which is connected to the data line 6a where the parasitic capacitance of the wiring of the gate electrode 71g is smaller than the other data lines 6a in the layout, it is possible to match up the potentials after having been written to be the same as the other data lines 6a.

Here, the method for setting the parasitic capacitance C1 in the S-TFT 71 in this manner is able to draw out this effect by the overlapping amounts L of at least one S-TFT 71 being different with regard to another S-TFT 71 out of the S-TFTs 71 which are electrically connected to the data lines 6a which are driven with the same phase in each of the series of image signals (VID1 to VID6) in the phase development driving described above. In other words, the liquid crystal device 100 has at least two or more types of S-TFTs 71 where the overlapping amounts L, where the gate electrode 71g and the data line 6a overlap via the third insulation film 12c, are different.

Differences in the overlapping amounts L include when the overlapping amount L in one S-TFT 71 is "zero", that is, when the gate electrode 71g and the data line 6a do not overlap. For example, with the structural parasitic capacitance in the specific data line 6a where overlapping amount L of the S-TFT 71 is "zero" as a reference, the size of the parasitic capacitance C1 in the S-TFT 71 which is connected to another data line 6a may be adjusted so that there is no difference between the structural parasitic capacitance with the other data line 6a.

As a method for adjusting the structural parasitic capacitance for each of the data lines 6a in this manner, a method where additional capacitance is connected to each data line 6a is considered. However, in the forming of the additional capacitance, it is necessary to secure space for forming the additional capacitance on the element substrate 10. In addition, it is necessary for a pair of electrodes which configure the additional capacitance to be formed with a dielectric layer which is interposed by the pair of electrodes and the design and the manufacturing of the liquid crystal device 100 becomes complicated. Furthermore, when the additional capacitance is formed at the terminal side of the data line 6a which extends to the pixel region E, it is easy to be influenced by static electricity generated in the manufacturing process or the like, and in the worst case, the additional capacitance is damaged due to the static electricity and becomes, for example, an electrically short-circuited state. In the configuration where the parasitic capacitance C1 is formed in the S-TFT 71 in the present embodiment, it is possible for the structural parasitic capacitance to be adjusted for each data line 6a while avoiding the problems of the additional capacitance as described above.

According to the present embodiment described above, the following effects are obtained.

(1) In the liquid crystal device 100, the data lines 6a where six are one unit (series) are respectively connected to six S-TFTs 71 of the sampling circuit 7 and the image signals (VID1 to VID6) which are supplied from the image signal line 111 are selectively supplied to the respective data lines 6a. Due to the overlapping amounts L of the gate electrodes 71g of the S-TFT 71 and the data lines 6a differing, since it is possible for the value of the structural parasitic capacitance of the data lines 6a to be adjusted, it is possible for the display irregularities in series as streaks caused by the structural parasitic capacitance of the data lines 6a to not stand out. That is, the display irregularities in series as streaks are reduced and it is possible to provide the liquid crystal device 100 with a phase development driving method which has display quality with an excellent appearance.

(2) Since it is possible to adjust the structural parasitic capacitance of the data lines 6a by additionally forming the parasitic capacitance C1 between the gate electrodes 71g of the S-TFTs 71 and the data line 6a, it is possible to efficiently manufacture with high yield the liquid crystal device 100 which has a simple configuration and resistance with regard to static electricity and the like compared to a case where the structural parasitic capacitance is adjusted by connecting additional capacitance to each of the data lines 6a.

Second Embodiment

Figure 5:
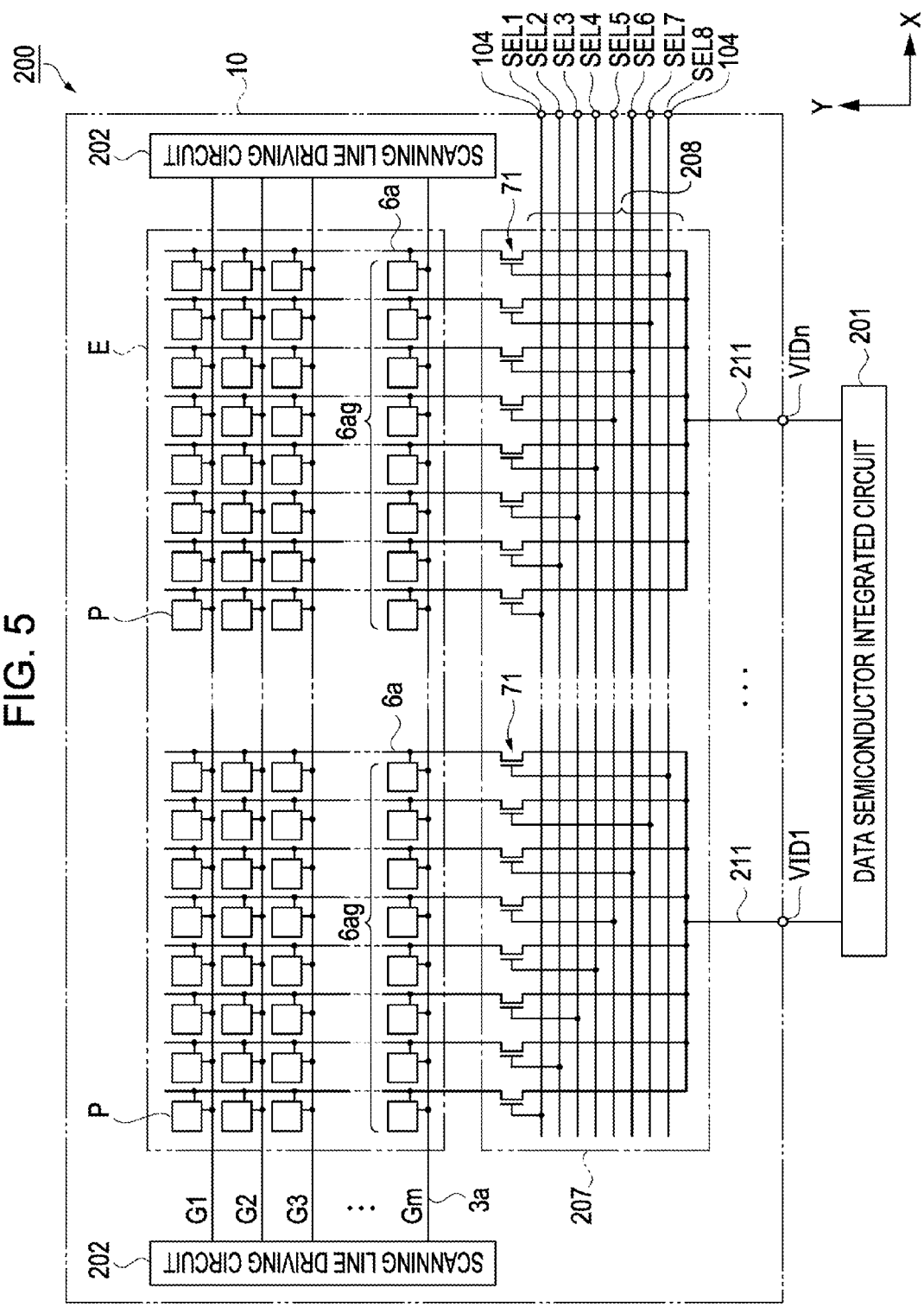
FIG. 5 is a circuit diagram illustrating a main circuit configuration of a liquid crystal device according to a second embodiment.

Next, a liquid crystal device of a second embodiment will be described with reference to FIG. 5. FIG. 5 is a circuit diagram illustrating a main circuit configuration of the liquid crystal device according to the second embodiment. The liquid crystal device according to the second embodiment differs in terms of the method of driving the plurality of data lines 6a with regard to the liquid crystal device 100 of the first embodiment. Accordingly, the same reference numerals are attached to the same configurations as the liquid crystal device 100 and the detailed description is omitted.

As shown in FIG. 5, a liquid crystal device 200 of the present embodiment has a plurality of the pixels P which are partitioned by a plurality of the scanning lines 3a and a plurality of the data lines 6a and are arranged in a matrix formation in the pixel region E on the element substrate 10 side. In addition, a semiconductor integrated circuit (IC) 201 as a driving circuit which drives the pixels P, a scanning line driving circuit 202, and a multiplexer circuit 207 are provided. In addition, there is a plurality (eight) of selection signal supply lines 208 which supply selection signals (SEL1 to SEL8) from the semiconductor integrated circuit 201 as the selection signal supply means which is connected to the external connection terminals 104. Here, wiring which links the selection signal supply lines 208 and the semiconductor integrated circuit 201 are omitted from the diagram in FIG. 5.

The multiplexer circuit 207 has a plurality of the sampling transistors (S-TFT) 71 which corresponds to each of the plurality of data lines 6a. The plurality of data lines 6a are formed into blocks (series) with the number of selection signal supply lines 208 as a unit. Hereinafter, the plurality (eight) of data lines 6a which form a block (series) are referred to as a data line group 6ag.

For example, in the left side of the data line group 6ag, the eight data lines 6a which form a block (series) are respectively connected to the drains of the S-TFTs 71. The wirings which connect to the source of the eight S-TFTs 71 are grouped into one and connects to the image signal line 211 which supplies the image signal VID1 out of the image signals (VID1 to VIDn) which are supplied from the semiconductor integrated circuit (abbreviated below simply to IC) 201. The respective gates of the eight S-TFTs 71 are connected from the left side in the order of the selection signals (SEL1 to SEL8) which are supplied from the selection signal supply line 208. That is, there is a configuration where the plurality of data lines 6a are formed into blocks (series) with the number of selection signal supply lines 208 as a unit and one of the image signal lines 211 is connected to each of the data line groups 6ag and is driving with a time division based on the selection signals (SEL1 to SEL8). Here, the data line group 6ag on the right side has the same configuration. Such a driving method is referred to as a hybrid driving method due to the scanning line driving circuit 202 is formed on the element substrate 10 but the semiconductor integrated circuit 201 is configured with an externally attached IC.

For example, in a configuration of 640×480 pixels P, since there are 640 of the data lines 6a and 480 of the scanning lines 3a and the 640 data lines 6a are formed into blocks (series) of eight, the number of the image signal lines 211 is 80 and the image signals (VID1 to VID80) are supplied from the IC 201. The scanning line driving circuit 202 sequentially exclusively sets the scanning signals G1, . . . , G480 to an H level (that is, selection voltage) for each horizontal period over a period of time of a certain one frame (nth frame).

Here, in one horizontal period, the selection signals SEL1 to SEL8 which are supplied from the semiconductor integrated circuit 201 exclusively become the H level in order, and in line with the supplying, the IC 201 supplies the image signals VID1 to VID80 to the image signal lines 211. The image signals VID1 to VID80 have data voltages which are chronologically serialized into eight series corresponding to the eight series of the data lines 6a in each of the $1^{st}$, $2^{nd}$, $3^{rd}$, . . . , to $80^{th}$ data line groups 6ag. In the multiplexer circuit 207, according to the eight series of selection signals SEL1 to SEL8, the data voltages, which are chronologically serialized for each of the image signals VID1 to VID80 using the S-TFTs 71, are each subjected to time division and allocated to the eight series of the data lines 6a in each of the data line groups 6ag.

In detail, the IC 201 outputs the high potential or low potential image signals VID1 to VID80 in bulk with regard to the potential (LCCOM) of the common electrode 23 of the opposing substrate 20 to correspond to the $1^{st}$, $2^{nd}$, $3^{rd}$, . . . , to $80^{th}$ data line groups 6ag with only the voltage corresponding to the gradients of the pixels P which correspond to the intersection of the jth scanning lines 3a and the first series of the data lines 6a when the selection signal SEL1 becomes the H level in a period when the $j^{th}$ scanning signal Gj (j=1, . . . , 480) becomes the H level. At this time, since only the selection signal SEL1 is the H level, the first series of the data lines 6a are selected (that is, only the S-TFT 71 which corresponds to the first series of the data line 6a is ON) and the image signals VID1 to VID 80 are supplied to each in the first series ($1^{st}$, $9^{th}$, . . . $633^{rd}$ columns) of the data lines 6a. On the other hand, when the scanning signal Gj is the H level, since the TFT 30 for switching of the pixels P is in an ON state in all of the pixels which are positioned on the $j^{th}$ row, the image signals VID1 to VID80 which are supplied to the first series of the data lines 6a are applied to each of the pixel electrodes 15 in the $j^{th}$ row and $1^{st}$ column, the $j^{th}$ row and $9^{th}$ column, . . . the $j^{th}$ and $633^{rd}$ column.

Next, the IC 201 outputs the image signals VID1 to VID80 in bulk to correspond to the $1^{st}$, $2^{nd}$, $3^{rd}$, . . . , to $80^{th}$ data line groups 6ag with a voltage corresponding to the gradients of the pixels P which correspond to the intersection of the $j^{th}$ scanning lines 3a and the second series of the data lines 6a at this time when the selection signal SEL2 becomes the H level. At this time, since only the selection signal SEL2 is the H level, the second series of the data lines 6a are selected and the image signals VID1 to VID 80 are supplied to each in the second series ($2^{nd}$, $10^{th}$, . . . $634^{th}$ columns) of the data lines 6a and are applied to each of the pixel electrodes 15 in the $j^{th}$ row and $2^{nd}$ column, the $j^{th}$ row and $10^{th}$ column, . . . the $j^{th}$ row and $634^{th}$ column.

In the same manner, the image signals VID1 to VID80 are output in bulk to correspond to the $1^{st}$, $2^{nd}$, $3^{rd}$, . . . , to $80^{th}$ data line groups 6ag with a voltage corresponding to the gradients of the pixels P which correspond to the intersection of the $j^{th}$ scanning lines 3a and the third to eight series of the data lines 6a at this time according to the selection state of the selection signals SEL3 to SEL8 in a period when the $j^{th}$ scanning signal Gj becomes the H level. Due to this, the potentials based on the image signals are sequentially supplied to the third series to the eighth series of the data lines 6a and are applied to the columns of the pixel electrodes 15 which correspond to the $j^{th}$ row.

Due to this, the operation of writing the voltages of the image signals according to the gradients is completed with regard to the pixels P in the jth row. Here, the voltages which are applied to the pixel electrode 15 are held until the writing of the next $(n+1)^{th}$ frame using the liquid crystal capacitance even when the scanning signal Gj is an L level (unselected voltage).

In the liquid crystal device 200 where hybrid driving is applied in this manner, for example, the parasitic capacitance C1 (refer to FIG. 4) is formed by overlapping the gate electrodes 71g of each of the S-TFTs 71 and the data lines 6a for the data line group 6ag via the third insulation film 12c and the overlapping amounts L are made to be different within a series. Due to this, it is possible to reduce the display irregularities in series as streaks generated by the original structural parasitic capacitance of the data line group 6ag. In addition, for example, in the data line groups 6ag which are adjacent in the extension direction of the scanning lines 3a, due to differences in the overlapping amounts L of the S-TFTs 71 which are connected to the data lines 6a of different series by being positioned at the boundaries of the blocks, it is possible to reduce the display irregularities in series as streaks generated in the boundaries of the blocks. Furthermore, if the overlapping amounts L differ with the data line group 6ag as a unit, improvements are possible with regard to the display irregularities in series as streaks generated with the data line group 6ag as a unit.

According to the liquid crystal device 200 in this manner, the display irregularities in series as streaks are reduced and it is possible to provide the liquid crystal device 200 with a hybrid driving method which has display quality with an excellent appearance.

Third Embodiment

Figure 6:
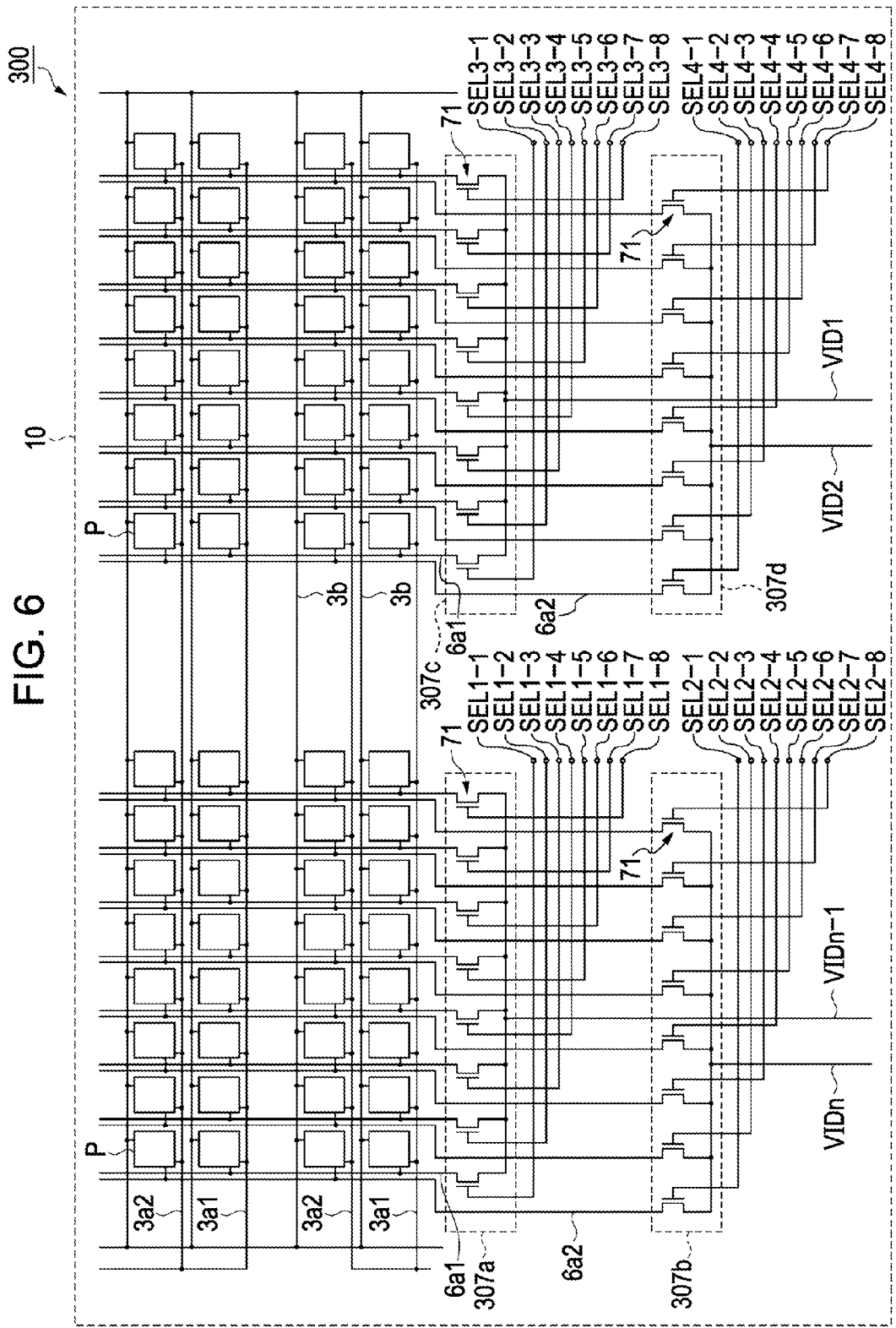
FIG. 6 is a circuit diagram illustrating a main circuit configuration of a liquid crystal device according to a third embodiment.

Next, a liquid crystal device of the third embodiment will be described with reference to FIG. 6. FIG. 6 is a circuit diagram illustrating a main circuit configuration of the liquid crystal device according to the third embodiment. The liquid crystal device of the third embodiment is an example where the hybrid driving method of the second embodiment is applied to 4 k2 k, so-called super Hi-Vision, which has four times the number of pixel of Hi-Vision (number of pixels; 1920×1080). Here, in FIG. 6, the circuit configuration of the main portions is shown and the circuit configuration across all of the pixels P is not shown. The same configurations as the liquid crystal device 200 of the second embodiment are given the same reference numeral and a detailed description is omitted.

As shown in FIG. 6, a liquid crystal device 300 has a plurality (4096×2160) of the pixels P which are partitioned by a plurality of scanning lines and a plurality of data lines and are arranged in a matrix formation in the pixel region on the element substrate 10 side. The plurality (2160) of scanning lines is formed from odd scanning lines 3a1 and even scanning lines 3a2 in the extension direction of the data lines. In addition, the plurality of data lines are formed from first data lines 6a1 which are provided to correspond to the odd scanning lines 3a1 and second data lines 6a2 which are provided to correspond to the even scanning lines 3a2. The first data lines 6a1 and the second data lines 6a2 extend between adjacent pixels P in a row direction (the extension direction of the scanning lines in FIG. 6). The odd or even scanning lines and the capacitance lines 3b extend between adjacent pixels P in a column direction (the extension direction of the data lines in FIG. 6). The capacitance lines 3b are connected to a fixed potential (for example, LCCOM).

The plurality of first data lines 6a1 are formed into blocks (series) with the number of selection signal supply lines as a unit and are respectively connected to the sampling transistors (S-TFT) 71 of multiplexer circuits 307a and 307c which are provided for each block. For example, in the multiplexer circuit 307a, the first data lines 6a1 are respectively connected to the drains of the respective S-TFTs 71 and the selection signal supply lines which supply the selection signals (SEL1-1 to SEL1-8) are connected in order to the gates of the respective S-TFTs 71. The connection wiring which is connected to the sources of the respective S-TFTs 71 are grouped as one and are connected to the image signal line which supplies the image signal VIDn-1.

In the same manner, for example, in the multiplexer circuit 307c, the first data lines 6a1 are respectively connected to the drains of the respective S-TFTs 71 and the selection signal supply lines which supply the selection signals (SEL3-1 to SEL3-8) are connected in order to the gates of the respective S-TFTs 71. The connection wiring which is connected to the sources of the respective S-TFTs 71 are grouped as one and are connected to the image signal line which supplies the image signal VID1. That is, between the multiplexer circuit 307a and the multiplexer circuit 307c, a multiplexer circuit is provided according to the number of first data line groups which form a block (series).

The second data lines 6a2 which extend in parallel with the first data lines 6a1 are formed into blocks (series) in the same manner with the number of selection signal supply lines as a unit and are respectively connected to the sampling transistors (S-TFT) 71 of multiplexer circuits 307b and 307d which are provided for each block. For example, in the multiplexer circuit 307b, the second data lines 6a2 are respectively connected to the drains of the respective S-TFTs 71 and the selection signal supply lines which supply the selection signals (SEL2-1 to SEL2-8) are connected in order to the gates of the respective S-TFTs 71. The connection wiring which connects the sources of the respective S-TFTs 71 are grouped as one and are connected to the image signal line which supplies the image signal VIDn.

In the same manner, for example, in the multiplexer circuit 307d, the second data lines 6a2 are respectively connected to the drains of the respective S-TFTs 71 and the selection signal supply lines which supply the selection signals (SEL4-1 to SEL4-8) are connected in order to the gates of the respective S-TFTs 71. The connection wiring which connects the sources of the respective S-TFTs 71 are grouped as one and are connected to the image signal line which supplies the image signal VID2. That is, between the multiplexer circuit 307b and the multiplexer circuit 307d, a multiplexer circuit is provided according to the number of second data line groups which form a block (series).

The liquid crystal device 300 has the circuit configuration and drives in a chronological series with a first data line group where the first data line 6a1 which corresponds to the odd scanning lines 3a1 form a block (series) as a first series and a second data line group where the second data line 6a2 which corresponds to the even scanning lines 3a2 form a block (series) as a second series.

In the multiplexer circuits 307a, 307b, 307c, and 307d of the liquid crystal device 300, the parasitic capacitance C1 (refer to FIG. 4), which has the overlapping amount L where the gate electrodes 71g of each of the sampling transistor (S-TFT) 71 and the first data lines 6a1 in a planar view via the third insulation film 12c, is formed as shown in FIG. 3. In the same manner, the parasitic capacitance C1 (refer to FIG. 4), which has the overlapping amount L where the gate electrodes 71g and the second data lines 6a2 in a planar view via the third insulation film 12c overlap, is formed.

Due to the differences in the structural parasitic capacitances of each of the first data lines 6a1 and the second data lines 6a2 each being adjusted using differences in the overlapping amounts L, alleviation is possible. That is, it is possible to improve the display irregularities in series as streaks caused by the parasitic capacitance.

The alleviation of the structural parasitic capacitance of each of the first data lines 6a1 and the second data lines 6a2 in this manner may be realized by using difference in the overlapping amount L in one data line group such as described in the second embodiment or may be realized by the overlapping amount L being different in the data lines which are positioned on the boundary of the adjacent data line groups. In addition, it may be realized by the overlapping amount L being different within the data line group where the data line group is a unit.

Furthermore, in the case of the liquid crystal device 300, since the first data lines 6a1 of the first series and the second data lines 6a2 of the second series correspond with regard to the plurality of pixels P which configure the same display columns (the columns in the extension direction of the data lines in FIG. 6), it is also possible to alleviate the difference in the parasitic capacitance of the data line group with the series by realizing the differences in the overlapping amount L between the first series and the second series.

In addition, the differences in the parasitic capacitance may be alleviated by the overlapping amount L being secured in one of the series out of the first series and the second series and the overlapping amount L being "zero" in the other series, that is, the gate electrode 71g and the data line not overlapping. By doing this, it is possible to simply alleviate the difference in the parasitic capacitance in the data line group between the first series and the second series.

In addition, when the size of the pixel region in the liquid crystal device 300, that is, the screen, is constant, the arrangement pitch of the pixels P when performing the display in super Hi-Vision is small compared to in Hi-Vision. As a method of arranging the first data lines 6a1 and the second data lines 6a2 in the gaps between the adjacent pixels P where the arrangement pitch is smaller, a method is included where the second data lines 6a2 are layered (stacked) with regard to the first data lines 6a1 via an interlayer insulation film after the first data lines 6a1 have been previously arranged between the pixels P in the element substrate 10. According to the arrangement of the first data lines 6a1 and the second data lines 6a2 in this manner, it is easy for differences in the parasitic capacitance to occur in the data line group between the first series and the second series. Then, in a plurality of pixels P (first pixels) according to the odd scanning lines 3a1 and a plurality of pixels P (second pixels) according to the even scanning lines 3a2, a difference occurs in the potential based on the image signal which is applied due to the difference in the parasitic capacitance in each of the data line groups and display irregularities in series as streaks are generated in the extension direction of the scanning lines. In such a case, it is preferable to alleviate the difference in the structural parasitic capacitance of the first data lines 6a1 and the second data line 6a2 by forming the parasitic capacitance C1 due to the overlapping of the gate electrode 71g of the S-TFT 71, which is connected to the first data line 6a1 positioned at a side close to the element substrate 10, that is, a lower layer, and the first data line 6a1, and by not overlapping the gate electrode 71g of the S-TFT 71, which is connected to the second data line 6a2 positioned at a side farther from the element substrate 10, that is, an upper layer, and the second data line 6a2. In other words, it is possible to optimize the potential based on the image signal which is applied to the first data line 6a1 positioned at the lower layer with the potential according to the image signal which is applied to the second data line 6a2 positioned at the upper layer as a reference. This is because, since the parasitic capacitance caused by the structure of the first data line 6a1 positioned at the lower layer is smaller than the structure of the second data line 6a2 positioned at the upper layer, it is preferable to correct the parasitic capacitance caused by the structure thereof by forming the parasitic capacitance C1 due to the overlapping of the gate electrode 71g of the S-TFT 71 which is connected to the first data line 6a1 and the first data line 6a1.

According to the third embodiment, the display irregularities, which are a series of streaks caused by the parasitic capacitance in the data line group in the first series and the second series, are improved and it is possible to provide the liquid crystal device 300 which is able to display in super Hi-Vision where a uniform display quality is able to be obtained in the pixel region.

Fourth Embodiment

Electronic Apparatus

Figure 7:
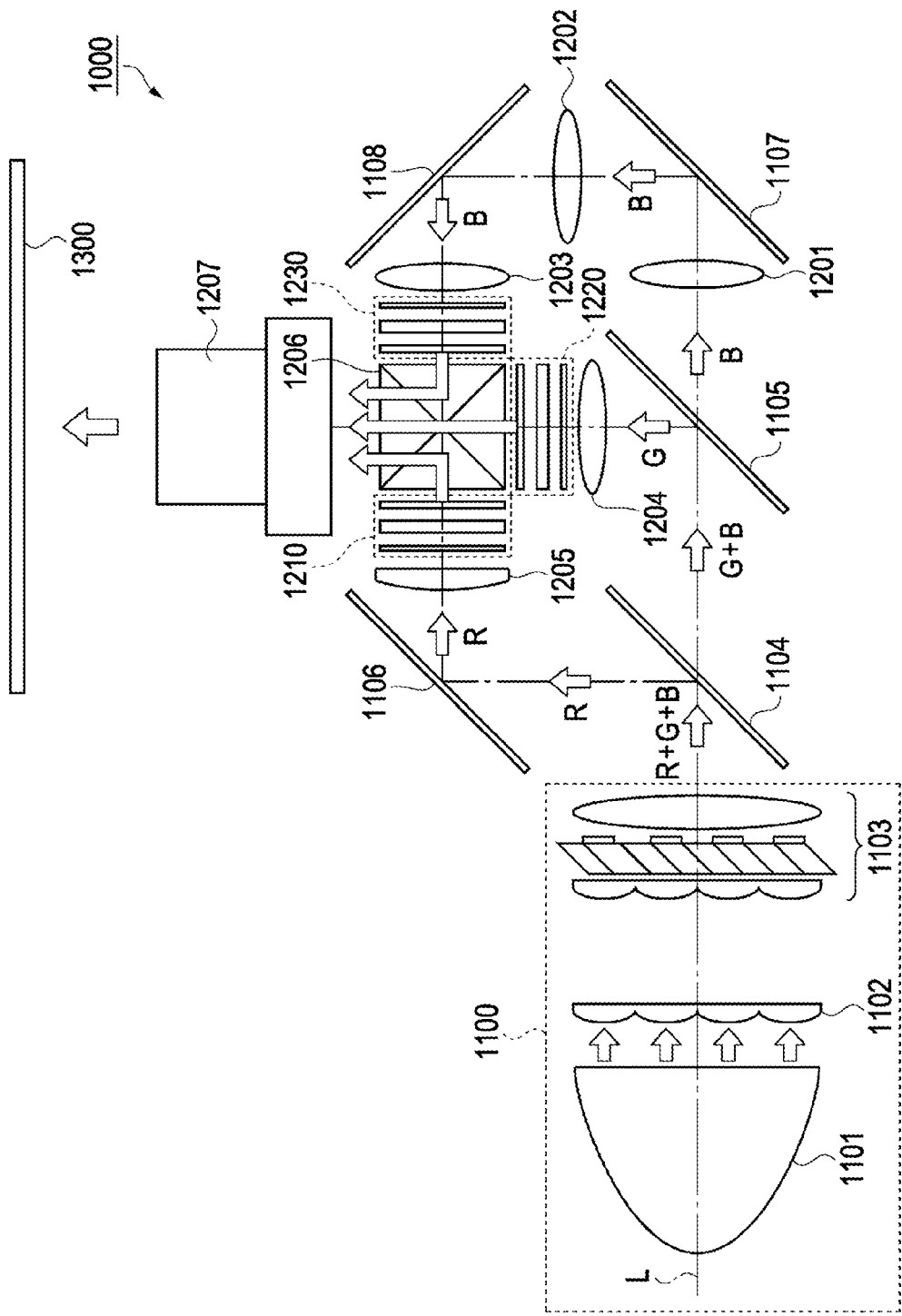
FIG. 7 is a schematic view illustrating a configuration of a projection type display device.

Next, the configuration of a projection type display device as an electronic apparatus of the present embodiment will be described with reference to FIG. 7. FIG. 7 is a schematic view illustrating a configuration of a projection type display device.

As shown in FIG. 7, a projection type display device 1000 as the electronic apparatus of the invention is provided with a polarization illumination device 1100 which is arranged along a system optical axis L, two dichroic mirrors 1104 and 1105 as light separating elements, three reflection mirrors 1106, 1107, and 1108, five relay lenses 1201, 1202, 1203, 1204, and 1205, three transparent liquid crystal light valves 1210, 1220, and 1230 as optical modulation means, a cross dichroic prism 1206 as a photosynthesis element, and a projection lens 1207.

The polarization illumination device 1100 is substantially configured from a lamp unit 1101 as a light source which is formed from a white light source such as a ultra-high pressure mercury lamp or a halogen lamp, an integrator lens 1102, and a polarization conversion element 1103.

The dichroic mirror 1104 reflects red light (R) out of the polarized light fluxes which are emitted from the polarization illumination device 1100 and transmits green light (G) and blue light (B). The other dichroic mirror 1105 reflects the green light (G) which is transmitted by the dichroic mirror 1104 and transmits blue light (B).

The red light (R) which is reflected by the dichroic mirror 1104 passes through the relay lens 1205 after being reflected by the reflection mirror 1106 and is incident on the liquid crystal light valve 1210.

The green light (G) which is reflected by the dichroic mirror 1105 passes through the relay lens 1204 and is incident on the liquid crystal light valve 1220.

The blue light (B) which pass through the dichroic mirror 1105 passes through a light guiding system formed from the three relay lens 1201, 1202, and 1203 and the two reflection mirrors 1107 and 1108 and is incident on the liquid crystal light valve 1230.

The liquid crystal light valves 1210, 1220, and 1230 are respectively arranged to be opposed with regard to the incidence surface for each of the colors of light in the cross dichroic prism 1206. The colored light which is incident on the liquid crystal light valves 1210, 1220, and 1230 are modulated based on the video information (video signal) and are emitted toward the cross dichroic prism 1206. The prism is where four right-angled prisms are combined and a dielectric multi-layer film which reflects red light and a dielectric multi-layer film which reflects blue light are formed in a cross shape in an inner surface thereof. The three colors of light are synthesized by the dielectric multi-layer films and the light which expresses a color image is synthesized. The light which has been synthesized is projected onto a screen 1300 using the projection lens 1207 which is a projection optical system and the image is formed by being enlarged.

The liquid crystal light valve 1210 is the application of the liquid crystal device 100 described above. The liquid crystal device 100 is arranged with a gap between the pair of polarization elements which are arranged in a cross Nichol shape in the incident side and the emission side of the colored light. The other liquid crystal light valves 1220 and 1230 are the same.

According to the projection type display device 1000, since the liquid crystal device 100 with high display quality which reduces display irregularities in series as streaks is used as the liquid crystal light valves 1210, 1220, and 1230, display quality with excellent appearance is realized. Here, it is possible for the liquid crystal device 200 of the second embodiment and the liquid crystal device 300 of the third embodiment to be used as the liquid crystal light valves 1210, 1220, and 1230.

Here, the invention is not limited to the embodiments described above and appropriate modifications are possible which are in the range which does not depart from the gist or the concept of the invention as taken by reading from the scope of the claims and the specifications and the electro-optical devices according to the modification and the electronic apparatuses where these electro-optical devices are applied are included in the technical scope of the invention. Various modifications other than the embodiments described above are able to be considered. Below, modification examples are described as examples.

Modification Example 1

The main circuit configuration of the liquid crystal device 100 with the phase development driving method which has at least two types of sampling transistors (S-TFT) 71 where the overlapping amounts L where a portion of the gate electrode 71g and the data line overlap on the semiconductor layer 71a, and in the same manner, the liquid crystal device 200 with the hybrid driving method and the liquid crystal 300 with the hybrid driving method which corresponds to super Hi-Vision are not limited thereto. For example, it is possible to arbitrarily select the number of the image signal lines which supply the image signals, the number of the selection signal supply lines which supply the selection signals, and the like to correspond to the number of pixels and the driving method.

In addition, the wiring structure where the first data lines 6a1 and the second data lines 6a2 are arranged using layering (stacking) in the gaps between the adjacent pixels P in the extension direction of the scanning lines is not limited to the liquid crystal device 300 and is able to be applied to the liquid crystal device 200 and the liquid crystal device 100.

Modification Example 2

The configuration of the liquid crystal device 100 which is provided with at least two types of sampling transistors (S-TFT) 71 where the overlapping amounts L where a portion of the gate electrode 71g and the data line 6a overlap on the semiconductor layer 71a is not limited to being transparent. For example, it is possible to apply the invention with regard to a reflection type of liquid crystal device where the pixel electrodes 15 are configured from, for example, Al (aluminum) or the like which is light reflective.

Modification Example 3

The configuration of the electro-optical device which is provided with at least two types of sampling transistors (S-TFT) 71 where the overlapping amounts L where a portion of the gate electrode 71g and the data line 6a differ on the semiconductor layer 71a is not limited to the light receiving types of the liquid crystal devices 100, 200, and 300. For example, it is possible to apply the invention also to a self-emitting type of display device which is provided with a light emitting element such as an organic electroluminescent (EL) element in a plurality of the pixels P which are arranged in a matrix formation.

Modification Example 4

The electronic apparatus where it is possible for the liquid crystal devices 100, 200, and 300 to be applied is not limited to the projection type display device 1000 of the embodiment. It is possible to be appropriately used as a display section of an information terminal units such as a projection type HUD (heads-up display) or a direct view type HMD (head mounted display), an electronic book, a personal computer, a digital still camera, a liquid crystal TV, a view finder type or a monitor direct view type video tape recorder, a car navigation system, an electronic organizer, or a POS.

The entire disclosure of Japanese Patent Application No. 2011-218975, filed Oct. 3, 2011 is expressly incorporated by reference herein.

What is claimed is:

1. An electro-optical device comprising:
   an image signal line, an image signal being supplied to the image signal line;
   a plurality of pixels disposed in a pixel region that displays an image;
   a first data line that is electrically connected to a source of a first thin film transistor ("TFT") formed in the plurality of pixels;
   a second data line that is electrically connected to a source of a second TFT formed in the plurality of pixels; and
   an electronic circuit disposed in a peripheral region that is positioned between the pixel region and one side of the electro-optical device, the electronic circuit including:
      a first transistor that is electrically connected between the first data line and the image signal line, and that supplies the image signal to the first data line; and
      a second transistor that is electrically connected between the second data line and the image signal line, and that supplies the image signal to the second data line,
   wherein
      the first data line has a first width in an area overlapping the first transistor of the electronic circuit and a second width in the pixel region, the first width being different than the second width,
      the second data line has a third width in an area overlapping the second transistor of the electronic circuit and a fourth width in the pixel region, the third width being different than the fourth width,
      an overlapping amount of a gate electrode of the first transistor and the first data line and an overlapping amount of a gate electrode of the second transistor and the second data line are different,
      the gate electrode of the first transistor and the first data line overlap via an insulation film, and
      the gate electrode of the second transistor and the second data line overlap via the insulation film.

2. The electro-optical device according to claim 1, further comprising:
   a selection signal supplier that supplies a first selection signal to the gate electrode of the first transistor, and that supplies a second selection signal to the gate electrode of the second transistor, the first selection signal and the second selection signal being same phase, the image signal line having a first image signal line that is electrically connected to the first transistor and a second image signal line that is electrically connected to the second transistor.

3. The electro-optical device according to claim 1, further comprising:
a first selection signal supply line that is electrically connected to the gate electrode of the first transistor, a first selection signal being supplied to the first selection signal supply line;
a second selection signal supply line that is electrically connected to the gate electrode of the second transistor, a second selection signal being supplied to the second selection signal, a timing of supplying the second selection signal being different to a timing of supplying the first selection signal; and
selection signal supplier that supplies the first selection signal and the second selection signal.

4. The electro-optical device according to claim 1, further comprising:
a scanning line;
a first pixel that is disposed corresponding to an intersection of the scanning line and the first data line; and
a second pixel that is disposed corresponding to an intersection of the scanning line and the second data line,
the first pixel being disposed corresponding to one of a plurality of odd rows and the second pixel being disposed corresponding to one of a plurality of even rows.

5. The electro-optical device according to claim 1,
the first data line being disposed at a lower layer of the second data line, and
the overlapping amount of the gate electrode of the first transistor being larger than the overlapping amount of the gate electrode of the second transistor and the second data line.

6. The electro-optical device according to claim 1,
the gate electrode of the second transistor not overlapping with the second data line via an insulation film.

7. An electronic apparatus comprising:
the electro-optical device according to claim 1.

8. An electronic apparatus comprising:
the electro-optical device according to claim 2.

9. An electronic apparatus comprising:
the electro-optical device according to claim 3.

10. An electronic apparatus comprising:
the electro-optical device according to claim 4.

11. An electronic apparatus comprising:
the electro-optical device according to claim 5.

12. An electronic apparatus comprising:
the electro-optical device according to claim 6.

* * * * *